US010845785B2

United States Patent
Kojima et al.

(10) Patent No.: US 10,845,785 B2
(45) Date of Patent: Nov. 24, 2020

(54) CONTROL UNIT, DATA REFRESH METHOD, AND DATA REFRESH PROGRAM

(71) Applicant: OMRON Corporation, Kyoto (JP)

(72) Inventors: Tatsuya Kojima, Kyoto (JP); Koji Yaoita, Kyoto (JP); Katsushige Ohnuki, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/326,087

(22) PCT Filed: Aug. 23, 2017

(86) PCT No.: PCT/JP2017/030048
§ 371 (c)(1),
(2) Date: Feb. 15, 2019

(87) PCT Pub. No.: WO2018/061537
PCT Pub. Date: Apr. 5, 2018

(65) Prior Publication Data
US 2019/0187669 A1 Jun. 20, 2019

(30) Foreign Application Priority Data
Sep. 30, 2016 (JP) .................. 2016-194882

(51) Int. Cl.
*G05B 19/418* (2006.01)
*G06F 8/656* (2018.01)
(Continued)

(52) U.S. Cl.
CPC ..... *G05B 19/41835* (2013.01); *G05B 19/042* (2013.01); *G06F 8/656* (2018.02);
(Continued)

(58) Field of Classification Search
CPC ............ G05B 19/042; G05B 19/41835; G05B 2219/13004; G05B 2219/13167;
(Continued)

(56) References Cited

U.S. PATENT DOCUMENTS 5,970,243 A  10/1999 Klein et al.
9,921,563 B2 *  3/2018 Viste .................. G05B 19/0426
(Continued)

FOREIGN PATENT DOCUMENTS

JP  S62-89108 A  4/1987
JP  H08-106307 A  4/1996
(Continued)

OTHER PUBLICATIONS

Extended European search report dated Jan. 15, 2020 in a counterpart European patent application.
(Continued)

*Primary Examiner* — Abdelmoniem I Elamin
(74) *Attorney, Agent, or Firm* — Metrolex IP Law Group, PLLC

(57) ABSTRACT

A control unit includes: a memory; a computation control part; and an input and output unit for connecting the computation control part to a device of an (FA) system. A system program includes a data refresh program for executing a data refresh of data of the device and the control data of the memory via the input and output unit. If the computation control part receives a change of a control program, the computation control part stops executing the control program. The computation control part executes the change of the control program while executing a part of the system program including the data refresh, and resumes executing the control program.

4 Claims, 4 Drawing Sheets

(51) Int. Cl.
　　　*G06F 11/00*　　　(2006.01)
　　　*G06F 9/445*　　　(2018.01)
　　　*G05B 19/042*　　　(2006.01)
(52) U.S. Cl.
　　　CPC .............. *G06F 9/445* (2013.01); *G06F 11/00*
　　　　　(2013.01); *G05B 2219/13004* (2013.01); *G05B*
　　　　　　*2219/13167* (2013.01); *G05B 2219/32043*
　　　　　(2013.01); *G05B 2219/34193* (2013.01); *G05B*
　　　　　　　　　　　　*2219/50193* (2013.01)
(58) Field of Classification Search
　　　CPC ........... G05B 2219/32043; G05B 2219/34193;
　　　　　　　　G05B 2219/50193; G06F 11/00; G06F
　　　　　　　　　　　　　　8/656; G06F 9/445
　　　See application file for complete search history.

(56) References Cited

U.S. PATENT DOCUMENTS

| 9,958,848 | B2* | 5/2018 | Rischar | G05B 19/042 |
| 10,037,203 | B1* | 7/2018 | Chavez | G06F 8/656 |
| 2016/0246276 | A1* | 8/2016 | Rischar | G05B 19/042 |
| 2017/0082989 | A1 | 3/2017 | Kumagai et al. | |
| 2017/0097624 | A1* | 4/2017 | Viste | G05B 19/0426 |
| 2017/0099158 | A1 | 4/2017 | Mizutani et al. | |

FOREIGN PATENT DOCUMENTS

| JP | H11-259308 A | 9/1999 |
| JP | 2000-105604 A | 4/2000 |
| JP | 2007-140655 A | 6/2007 |
| JP | 2014-89883 A | 5/2014 |
| WO | 2015/133175 A1 | 9/2015 |
| WO | 2015/146281 A1 | 10/2015 |

OTHER PUBLICATIONS

English translation of the International Search Report of PCT/JP2017/030048 dated Oct. 3, 2017.
Written Opinion of PCT/JP2017/030048 dated Oct. 3, 2017.
Japanese Office Action dated Sep. 1, 2020 in a counterpart Japanese patent application.

* cited by examiner

Page 1 of US 10,845,785 B2

CONTROL UNIT, DATA REFRESH METHOD, AND DATA REFRESH PROGRAM

TECHNICAL FIELD

The present invention relates to a control unit for FA systems, and a data refresh technique in FA systems.

BACKGROUND ART

Currently, many FA (Factory Automation) systems are used.

As described in Patent Documents 1 and 2, external devices of an FA system are controlled by a control unit (programmable logic controller).

At this time, the control unit performs batch conversion (data refresh) of control data with respect to devices such as the external devices connected to the control unit. Specifically, after the control unit executes a series of programs for controlling the FA system, the control unit performs a data refresh and again executes the series of programs. Then, the FA system is controlled by repeating this process.

RELATED ART DOCUMENT

Patent Document 1: JP 2007-140655A
Patent Document 2: JP 2000-105604A

SUMMARY OF THE INVENTION

However, if conventional control units are subject to a program change from the outside, the conventional control units temporarily stop all the programs including a data refresh. For this reason, for example, when temperature control is performed, the temperature control is temporarily stopped, and thus the temperature may change. Also, the control of a servo motor is temporarily stopped, and a defect or the like of an article whose shape is controlled using the servo motor may occur. That is, the control of the FA system is temporarily stopped, and various defects may occur.

Accordingly, the present invention aims to provide a control unit and a data refresh technique that can prevent an unnecessary stop due to a data refresh, for example, at a time when a program is changed.

Means for Solving the Problems

A control unit according to the present invention includes a memory that stores a system program, a control program, and control data; a computation control part configured to execute the system program and the control program with reference to the control data; and an input and output unit for connecting the computation control part to a device of an FA system. The system program includes a data refresh program for executing a data refresh of data of the device and the control data of the memory via the input and output unit. If the computation control part receives a change of the control program, the computation control part stops executing the control program. The computation control part executes the change of the control program while executing a part of the system program including the data refresh, and resumes the execution of the control program.

With this configuration, when the control program is changed, a part of the system program is executed, and a data refresh is continued.

Effects of the Invention

According to the present invention, an unnecessary stop of the data refresh can be prevented, for example, at a time when a program is changed.

EMBODIMENTS OF THE INVENTION

Figure 1:
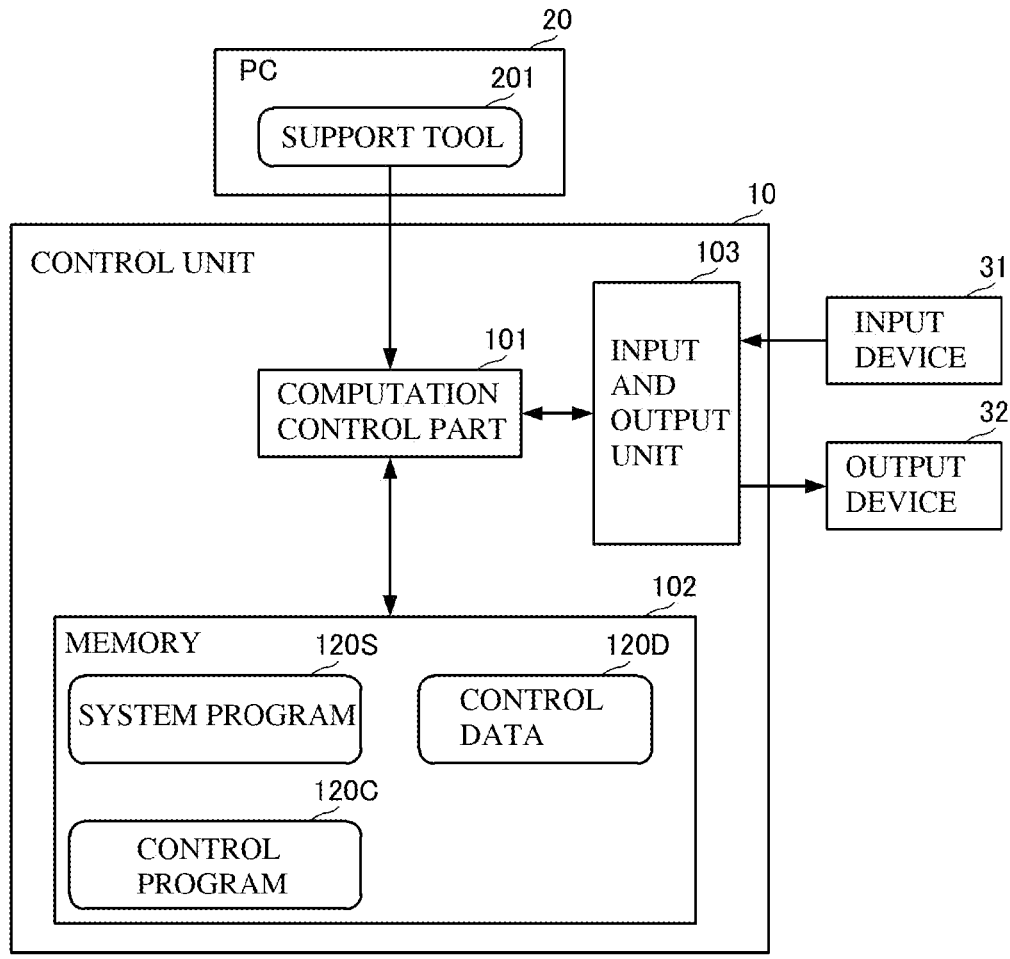
FIG. 1 is a block diagram showing a schematic configuration of an FA system including a control unit according to an embodiment of the present invention.
Figure 2:
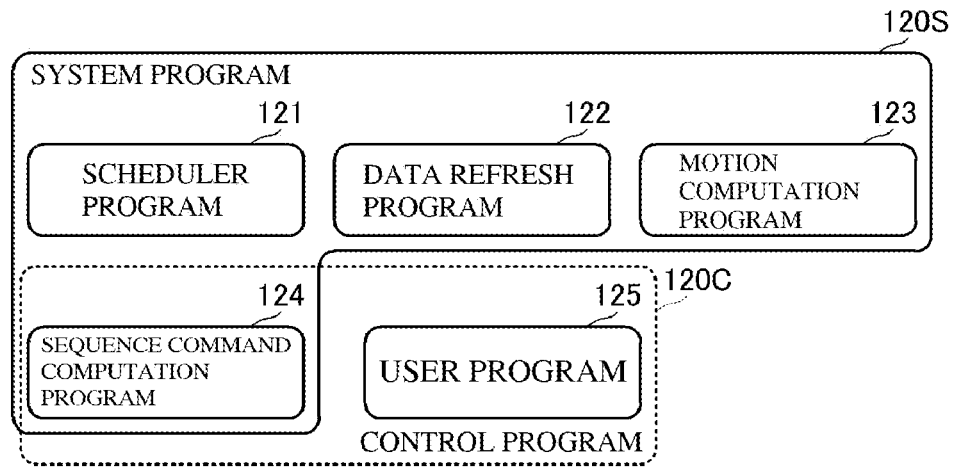
FIG. 2 is a diagram showing configurations of a system program and a control program.
Figure 3:
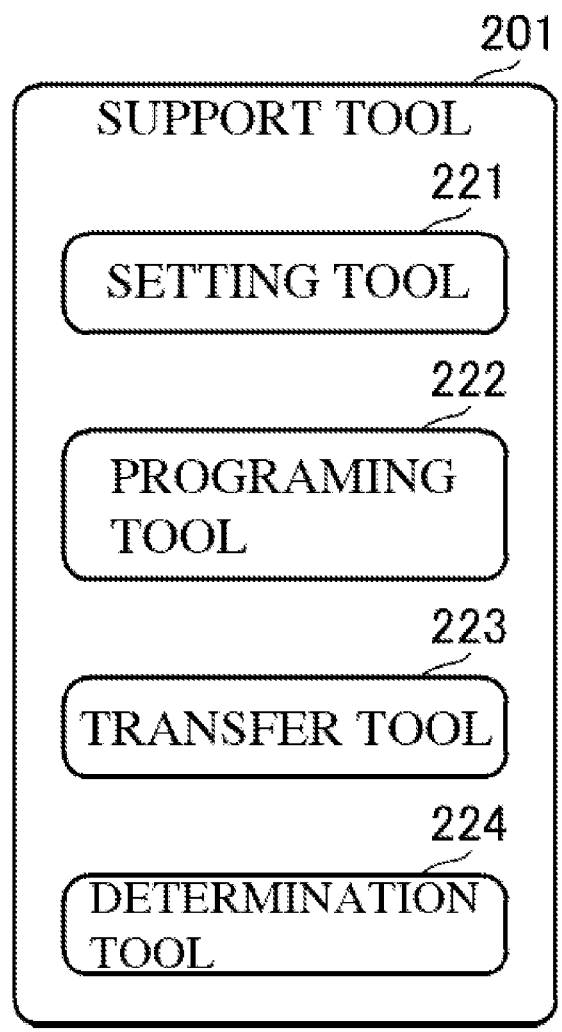
FIG. 3 is a diagram showing a configuration of a support tool.

A control unit and a data refresh technique according to an embodiment of the present invention will be described with reference to the drawings. FIG. 1 is a block diagram showing a schematic configuration of an FA system including the control unit according to the embodiment of the present invention. FIG. 2 is a diagram showing a configuration of a system program and a control program. FIG. 3 is a diagram showing a configuration of a support tool.

As shown in FIG. 1, a control unit 10 is connected to a PC (personal computer) 20, an input device 31, and an output device 32. The control unit 10, the input device 31, and the output device 32 are connected through a predetermined data network. The control unit 10, the input device 31, and the output device 32 realizes an FA (Factory Automation) system.

The input device 31 obtains, for example, predetermined data in switches, sensors, and the like of the FA system. The output device 32 executes predetermined operations in relay coils, motors, lamps, and the like of the FA system. Note, that, one input device 31 and one output device 32 are shown in FIG. 1, but multiple input devices 31 may be arranged and multiple output devices 32 may be arranged.

The control unit 10 and the PC 20 are locally connected via, for example, a general data communication cable. A support tool 201 is incorporated in the PC 20. The control unit 10 downloads programs and setting information that are created using the support tool 201.

The control unit 10 includes a computation control part 101, a memory 102, and an input and output unit 103.

The computation control part 101 is connected to the memory 102 and the input and output unit 103. The input and output unit 103 is connected to the input device 31 and the output device 32 via the above-mentioned data network.

As shown in FIG. 1, the memory 102 stores a system program 120S, a control program 120C, and control data 120D. As shown in FIG. 2, the system program 120S has a scheduler program 121, a data refresh program 122, a motion computation program 123, and a sequence command computation program 124. The control program 120C has the sequence command computation program 124 and a user program 125.

The control data 120D is referred to when the system program 120S and the control program 120C are executed.

The scheduler program 121 manages the schedules of various processes that the computation control part 101 executes.

The data refresh program 122 performs batch conversion of the control data 120D in the memory 102 and data of the input and output unit 103, and performs batch conversion of the control data 102D in the memory 102 and the data of the input device 31 and the output device 32 via the input and output unit 103. More specifically, the data refresh program 122 executes the process for refreshing the data from the input device 31 in the control data 120D via the input and output unit 103, and executes the process for outputting computation results from the motion computation program 123 and the user program 125 to the output device 32 via the input and output unit 103.

The motion computation program 123 performs computations for controlling motion devices such as motors (e.g., servo motors), based on the data that the input device 31 obtains.

The sequence command computation program 124 belongs to the system program 120S and the control program 120C, and is a program based on the ladder diagram that is created by the support tool 201.

The user program 125 executes various settings created by the support tool 201.

The computation control part 101 continuously executes the system program 120S and the control program 120C, while referring to the control data 120D. Specifically, based on the scheduler program 121, the computation control part 101 executes the motion computation program 123, the sequence command computation program 124, and the user program 125. At this time, the computation control part 101 refers to the control data 120D.

Upon completion of the execution of the motion computation program 123, the sequence command computation program 124, and the user program 125, the computation control part 101 executes the data refresh program 122. Specifically, the computation control part 101 performs, using the data refresh program 122, batch conversion of the control data 120D in the memory 102 and the data of the input device 31 and the output device 32 via the input and output unit 103.

Upon completion of the data refresh, the computation control part 101 executes the motion computation program 123, the sequence command computation program 124, and the user program 125 with reference to the control data 120D subjected to the data conversion. The FA system is controlled by the computation control part 101 repeating this series of processes.

As shown in FIG. 3, the support tool 201 has a setting tool 221, a programing tool 222, a transfer tool 223, and a determination tool 224. The setting tool 221 is used for creating the user program 125 including the above-mentioned various settings. The programing tool is used for creating a ladder diagram, in other words, is used for creating the sequence command computation program 124. The transfer tool 223 is used for converting the user program 125 created by the setting tool 221 and the sequence command computation program 124 created by the programing tool 222 into the data format to be transferred to the computation control part 101, and is used for transferring these data. The determination tool 224 is used for determining whether the data refresh needs to be stopped when the user program 125 and the sequence command computation program 124 are transferred.

Figure 4:
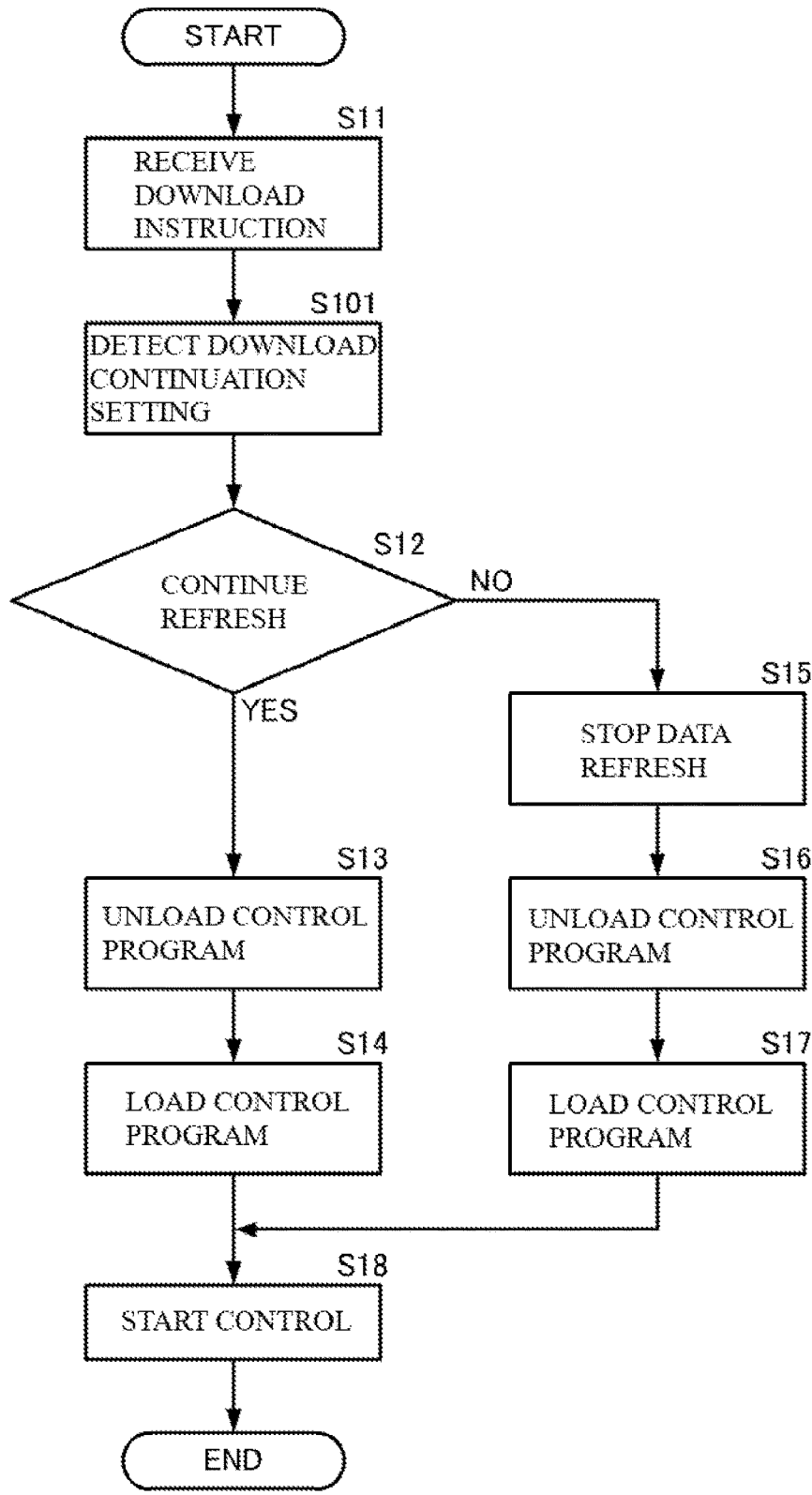
FIG. 4 is a flowchart of a data refresh process in a computation control part.

In this configuration, if the user program 125 and the sequence command computation program 124 are to be rewritten with the changes of the various settings and the ladder diagram, the computation control part 101 executes the following processes. FIG. 4 is a flowchart of a data refresh process in the computation control part.

As shown in FIG. 4, the computation control part 101 receives an instruction for rewriting the user program 125 and the sequence command computation program 124, that is, a download instruction (S11). While the computation control part 101 receives no download instruction, the computation control part 101 continuously executes, as mentioned above, the system program 120S including the data refresh, and the control using the control program 120C, while referring to the control data 120D.

The computation control part 101 refers to the download instruction, and detects whether to change the control program 120C while continuing the data refresh (S101).

If the detection result is the setting for continuing the data refresh (YES in S12), the computation control part 101 stops executing the control program 120C and unloads the control program 120C (S13). At this time, the computation control part 101 continuously executes a part of the system program 120S including the data refresh program 122 without stopping the execution, except for the sequence command computation program 124.

Next, the computation control part 101 loads the control program 120C (the sequence command computation program 124 and the user program 125) that is downloaded from the support tool 201 (S14). At this time, the computation control part 101 continuously executes a part of the system program 120S including the data refresh program 122 without stopping the execution, except for the sequence command computation program 124.

Then, the computation control part 101 resumes executing the control program 120C (S18).

By executing these processes, the control unit 10 can change the control program 120C without temporarily stopping the data refresh. In this manner, the above-mentioned defects in FA systems due to a temporary stop of a data refresh can be prevented.

Note, that if the detection result is the setting for not continuing the data refresh (NO in S12), the computation control part 101 stops executing the data refresh program 122 (S15). The computation control part 101 unloads the control program 120C (S16), and loads the control program 120C that is downloaded from the support tool 201 (S17). Then, the computation control part 101 resumes executing the system program 120S and the control program 120C (S18).

With this configuration, an administrator and the like of the FA system can select whether the change of the system program 120S and the control program 120C with the stop of the data refresh is needed.

Figure 5:
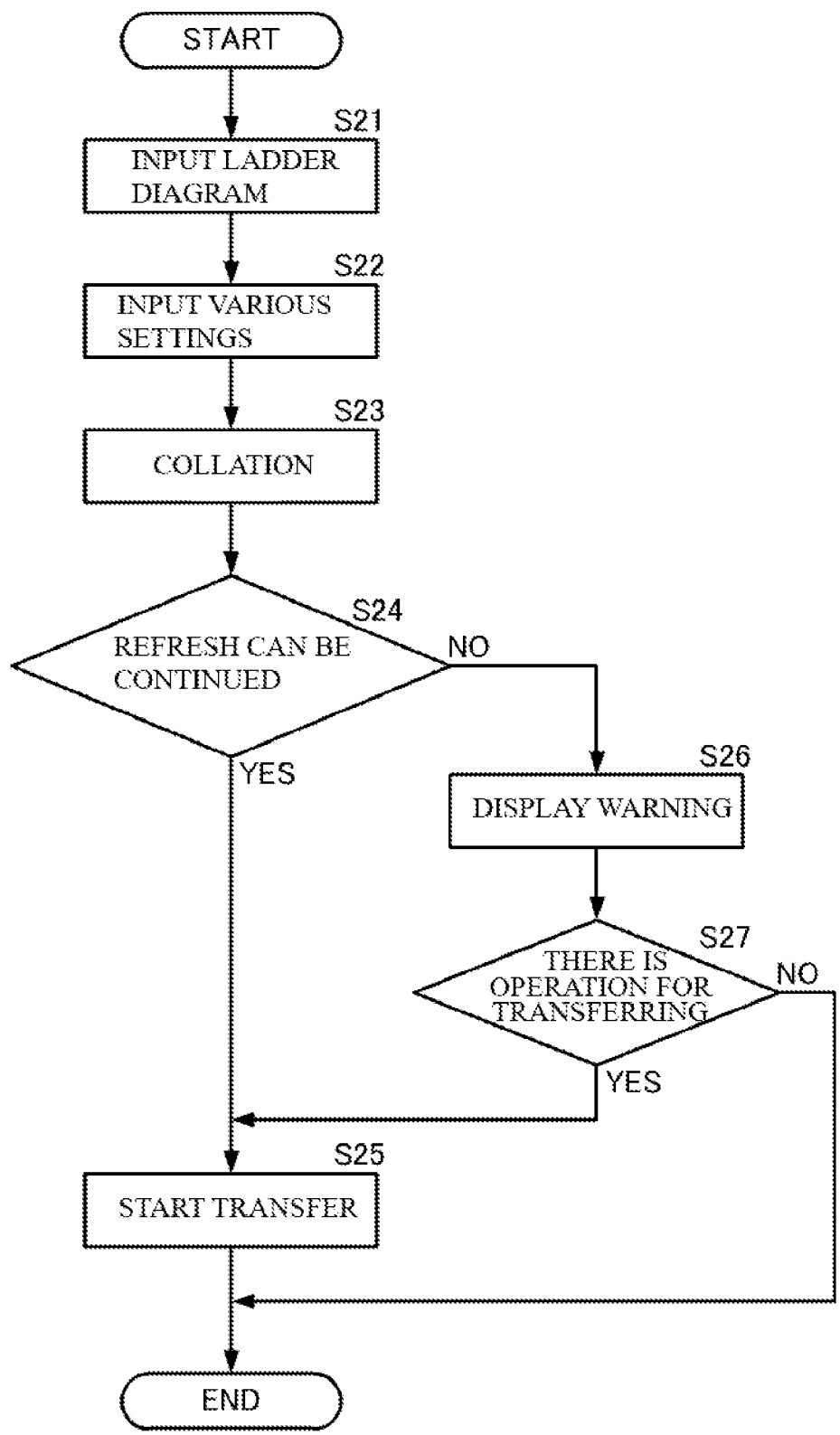
FIG. 5 is a flowchart of a program change process in the support tool.

In addition, as shown in FIG. 5, with the configuration shown in FIG. 3, the support tool 201 may also execute the transfer after it determines whether the stop of the data refresh is needed when the control program 120 is changed. FIG. 5 is a flowchart of a program change process in the support tool.

The support tool 201 receives an input of a ladder diagram from a programmer using a programming tool 222 (S21). Also, the support tool 201 receives an input regarding various settings from a programmer using the setting tool 221 (S22). Through these processes, the control program 120C is created, which has the sequence command computation program 124 and the user program 125. Note, that the order of step S21 and step S22 is not limited to this order, and may be reversed.

The support tool 201 collates, using the determination tool 224, the program that is created and changed by the support tool 201 and the program that is stored in the memory 102 of the control unit 10 (S23).

Based on the collation result, the support tool 201 determines, using the determination tool 224, whether the stop of the data refresh is needed when the control program 120C is changed.

If it is detected that the stop of the data refresh is not needed (YES in S24), the support tool 201 starts transferring the control program 120C (the sequence command computation program 124 and the user program 125) using the transfer tool 223 (S25).

If it is detected that the stop of the data refresh is needed (NO in S24), the support tool 201 displays a warning on the display of the PC 20 or the like (S26).

If the support tool 201 receives an operation input for transferring from a programmer (YES in S27), the support tool 201 starts transferring the control program 120C (S25). On the other hand, if the support tool 201 receives no operation input for transferring from the programmer (NO in S27), the support tool 201 ends the process.

INDEX TO THE REFERENCE NUMERALS

10 . . . control unit
20 . . . PC
31 . . . input device
32 . . . output device
101 . . . computation control part
102 . . . memory
103 . . . input and output unit
120C . . . control program
120D . . . control data
120S . . . system program
121 . . . scheduler program
122 . . . data refresh program
123 . . . motion computation program
124 . . . sequence command computation program
125 . . . user program
201 . . . support tool
221 . . . setting tool
222 . . . programing tool
223 . . . transfer tool
224 . . . determination tool

The invention claimed is:

1. A control unit comprising:
a memory that stores a system program, a control program comprising a sequence command computation program and a user program, and control data;
a computation control part configured to execute the system program, the sequence command computation program, and the user program with reference to the control data; and
an input and output unit connecting the computation control part to a device of a factory automation system, wherein
the system program comprises a data refresh program for executing a data refresh comprising: refreshing input data in the control data stored in the memory via the input and output unit; and outputting computation results via the input and output unit, and
the computation control part is configured to perform operations comprising:
stopping execution of the sequence command computation program and the user program in response to the computation control part receiving a change of the sequence command computation program or the user program, and continuing to execute the data refresh program;
executing the change of the sequence command computation program or the user program while continuing to execute the data refresh program; and
resuming execution of the sequence command computation program and the user program while continuing to execute the data refresh program.

2. The control unit according to claim 1, wherein the computation control part is configured to perform operations further comprising executing, in response to the computation control part receiving an instruction to change the sequence command computation program or the user program while continuing the data refresh, the change of the sequence command computation program or the user program while executing the data refresh program.

3. A data refresh method, comprising:
storing, in a memory, a system program, a control program comprising a sequence command computation program and a user program, and control data;
executing the system program, the sequence command computation program, and the user program with reference to the control data;
executing a data refresh program, included in the system program, for executing a data refresh comprising: refreshing input data in the control data stored in the memory; and outputting computation results;
receiving a change of the control program;
stopping execution of the sequence command computation program and the user program in response to receiving the change of the sequence command computation program or the user program and continuing to execute the data refresh program;
executing the change of the sequence command computation program or the user program while continuing to execute the data refresh program; and
resuming execution of the sequence command computation program and the user program while continuing to execute the data refresh program.

4. A non-transitory computer-readable storage medium storing a data refresh program, which when read and executed causes a computation control part to execute operations comprising:
storing, in a memory, a system program, a control program comprising a sequence command computation program and a user program, and control data;
executing the system program, the sequence command computation program, and the user program with reference to the control data;
executing a data refresh program, included in the system program, for executing a data refresh comprising: refreshing input data in the control data stored in the memory; and outputting computation results;
receiving a change of the control program;
stopping execution of the sequence command computation program and the user program in response to receiving the change of the sequence command computation program or the user program and continuing to execute the data refresh program;
executing the change of the sequence command computation program or the user program while continuing to execute the data refresh program; and
resuming execution of the sequence command computation program and the user program while continuing to execute the data refresh program.

* * * * *